(12) United States Patent
Skinner et al.

(10) Patent No.: US 6,355,928 B1
(45) Date of Patent: Mar. 12, 2002

(54) FIBER OPTIC TOMOGRAPHIC IMAGING OF BOREHOLE FLUIDS

(75) Inventors: Neal G. Skinner, Lewisville; Gerald Gardner, Richmond; Margaret Waid, Houston; Wallace R. Gardner, Houston; John Minear, Houston, all of TX (US)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 09/282,581

(22) Filed: Mar. 31, 1999
(Under 37 CFR 1.47)

(51) Int. Cl.[7] ................................................. G01V 8/00
(52) U.S. Cl. ................................. 250/269.1; 250/227.27
(58) Field of Search .......................... 250/269.1, 227.27, 250/231.19

(56) References Cited
U.S. PATENT DOCUMENTS 4,994,671 A * 2/1991 Safinya et al. ............... 250/255
5,315,110 A * 5/1994 Smith ...................... 250/227.27

* cited by examiner

Primary Examiner—Constantine Hannaher
Assistant Examiner—Otilia Gabor
(74) Attorney, Agent, or Firm—William M. Imwalle; Lawrence R. Youst

(57) ABSTRACT

This invention provides a method and an apparatus for fiber optic tomographic analysis and imaging of fluids. This invention includes a method for providing information on downhole fluid flowing in a hydrocarbon well, utilizing at least one downhole tomograph chamber (10). Light is introduced into the tomograph chamber (10) by an optical fiber bundle (24), and portions of the light are collected in other optical fiber bundles (32, 34). The collected portions of light are conveyed through the optical fiber bundles (32, 34) to a surface system (14), where the light is detected to produce signals proportional to the portions of light to provide information on optical properties of downhole fluid flowing in the well. This invention allows the generation of two or three dimensional images of multiple phase flow in the wellbore and allows determination of production parameters of multiple zones on an individual zone basis.

37 Claims, 5 Drawing Sheets

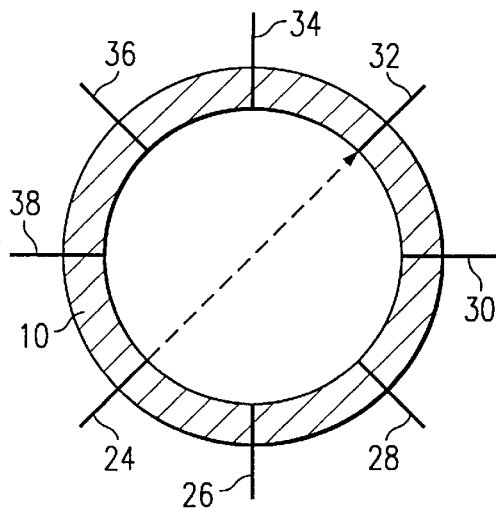
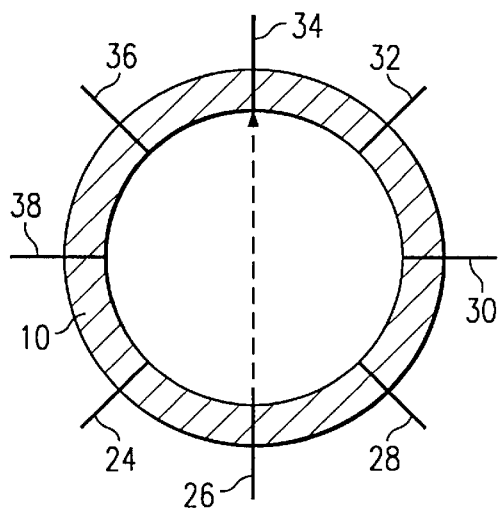
FIG. 2A    FIG. 2B
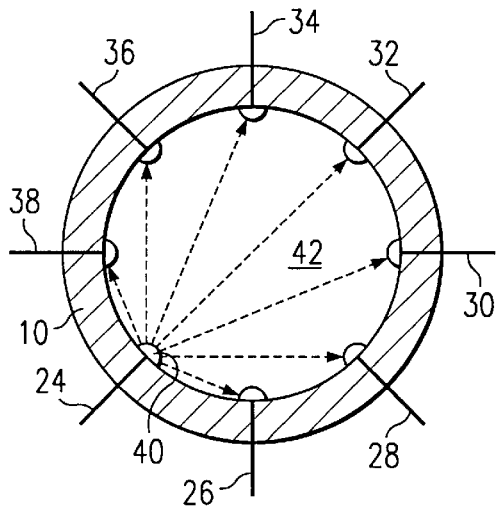
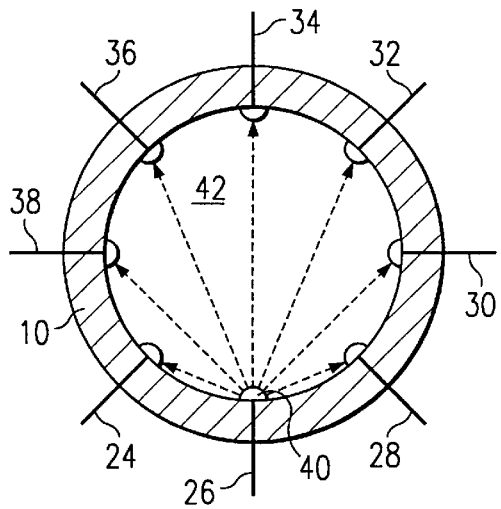
FIG. 3    FIG. 4
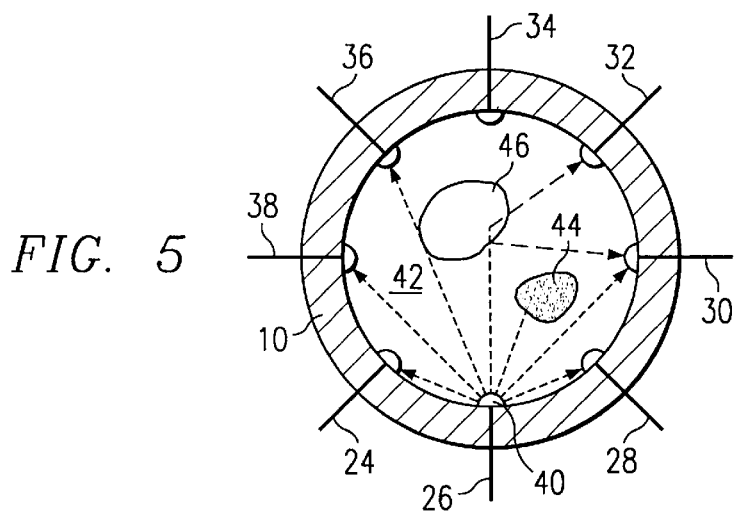
FIG. 5

FIBER OPTIC TOMOGRAPHIC IMAGING OF BOREHOLE FLUIDS

TECHNICAL FIELD OF THE INVENTION

This invention relates in general to analyzing hydrocarbon fluids and, more specifically, to an apparatus and method of obtaining information relating to the composition of downhole fluids flowing in a hydrocarbon well using fiber optics.

BACKGROUND OF THE INVENTION

Hydrocarbon fluids, such as oil and gas, generally are produced by wells drilled into hydrocarbon producing zones. Often there are multiple hydrocarbon producing zones that are traversed by each well. Perforations in the casing at each of the producing zones allow the fluids to enter the borehole, where the fluids can be recovered. Generally, tubing is used within the casing, which tubing extends to near the bottom of the hole. Liquids generally enter the annulus between the tubing and the casing and flow to the surface up the interior of the tubing.

It can be seen that in conventional wells, when multiple zones produce fluids, the fluids from all the zones are mixed together and returned up the tubing to the surface. Thus, while information can be obtained regarding the total production and combined composition of fluid of the well after the fluid exits the tubing at the surface, little information is available about downhole fluid flow or composition in each of several production zones. As such, only the total quantities of gas, water and oil can be measured at the top showing the composite from all the producing zones, and give little or no information on what is being produced from any one of the zones. Also, it can be seen that such information does not give flow details, for example, on sizes of oil drops or gas bubbles.

Therefore, a need has arisen for an apparatus and method for obtaining information regarding the composition of downhole fluids produced from a well. A need has also arisen for such an apparatus and method that allows for the determination of the composition of downhole fluids from individual zones in a well having multiple zones producing into a single tubing string.

SUMMARY OF THE INVENTION

The present invention disclosed herein comprises an apparatus and method for obtaining information about the composition of downhole fluids produced into a wellbore by imaging the downhole fluids within the wellbore with optical tomography. Through the imaging process, quantitative values of oil, water and gas are obtained. A determination of the composition of downhole fluids from individual zones producing into a single well may also be obtained using the optical tomography apparatus and method of the present invention.

The tomograph of the present invention, generally utilizes a bundle optical of fibers that pass downhole and are arrayed with ends pointing into a chamber through which the well fluid flows. The optical fibers run from terminations in a downhole optical tomograph chamber, up the wellbore to a surface system. Light is transmitted down one fiber or a bundle of fibers and is introduced into the downhole tomograph chamber. The other optical fibers or bundles of fibers each pick up portions of the light from the optical tomograph chamber and conduct these light portions up to the surface, where the light portions are detected by a number of light detectors. Preferably, the surface system includes a light source that is sequentially introduced into a first bundle of the optical fibers and sent downhole using a commutation process that, in effect, rotates the light introducing fiber around the chamber.

Portions of light sent through the first bundle of optical fibers carry the light source that is then picked up by detecting optical fiber bundles after the light has traveled through the downhole fluid. The proportions of light picked up by the detecting optical fiber bundles are a function of the fluid flowing through the chamber. The resultant light portions may then can be analyzed to produce an image of fluid flowing in the well. The commutation is preferably fast enough that very little movement of the multi phase fluids occurs during a single revolution or scan of the system.

The tomograph can be used, for example, in combination with seal assemblies between the tubing and the casing when multiple producing zones are encountered. Thus, for example, when there are two zones, typically two sets of casing perforations allow fluid to enter the well and be mixed together. However, in one embodiment of this invention, a seal assembly below the upper zone is used to prevent fluid from the upper zone from mixing with that of the lower zone, and an opening is provided through the tubing above the seal assembly, such that fluid from the upper zone enters the tubing above an optical tomograph, and thus does not pass through the tomograph. In this manner, the tomograph can analyze the fluid being produced by the lower zone unmixed with fluid from the upper zone. The combined production can then be measured at the surface, or in another tomograph higher in the tubing with the production of the lower zone subtracted to obtain production information on the upper zone.

The present invention allows the generation of two or three dimensional images of multiple phase flow in oil wells. This invention also allows determination of the production of multiple zones on an individual basis. No down hole electrical power is required, as all such power to the system can be provided by the surface system. Only optical energy need be transmitted downhole, and thus the system is intrinsically safe and does not pose an environmental hazard. No moving parts are required downhole, any commutation of transmitted signal can be handled at the surface.

This invention provides a method and an apparatus for fiber optic tomographic analysis and imaging of fluids. This invention includes a method for providing information on downhole fluids flowing in a hydrocarbon well, utilizing at least one downhole tomograph chamber. Light is introduced into the chamber by an optical fiber bundle, and portions of the light are collected in second and third optical fiber bundles. The collected portions of light are conveyed through the optical fiber bundles to a surface system, where the light is detected to produce signals proportional to the portions of light to provide information on optical properties of downhole fluid flowing in the well.

The invention is also an apparatus for providing information on downhole fluid flowing in a hydrocarbon well. The apparatus utilizes at least three optical fiber bundles having lower terminations in a downhole tomograph chamber in the well, and having upper terminations in a surface system. The surface system contains a light source and at least two light detectors. A commutator in the surface system links the light source, preferably sequentially, to the light introducing optical fiber bundles, and links light detectors to the receiving optical fiber bundles.

BRIEF DESCRIPTION OF THE DRAWINGS

For a more complete understanding of the present invention, including its features and advantages, reference is now made to the detailed description of the invention, taken in conjunction with the accompanying drawings of which:

FIGS. 2A and 2B are cross sectional views of a downhole optical tomography wherein the fluid is clear and the optical fibers do not have lenses;

FIG. 3 is a cross sectional view of a downhole optical tomograph wherein divergent lenses are utilized;

FIG. 4 is a cross sectional view of a downhole tomograph with the light source being commutated to an adjacent fiber;

FIG. 5 is a cross sectional view of a downhole tomograph with the divergent lenses illustrating the absorption, reflection and refraction that may occur in multi-phase fluids;

DESCRIPTION OF THE PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
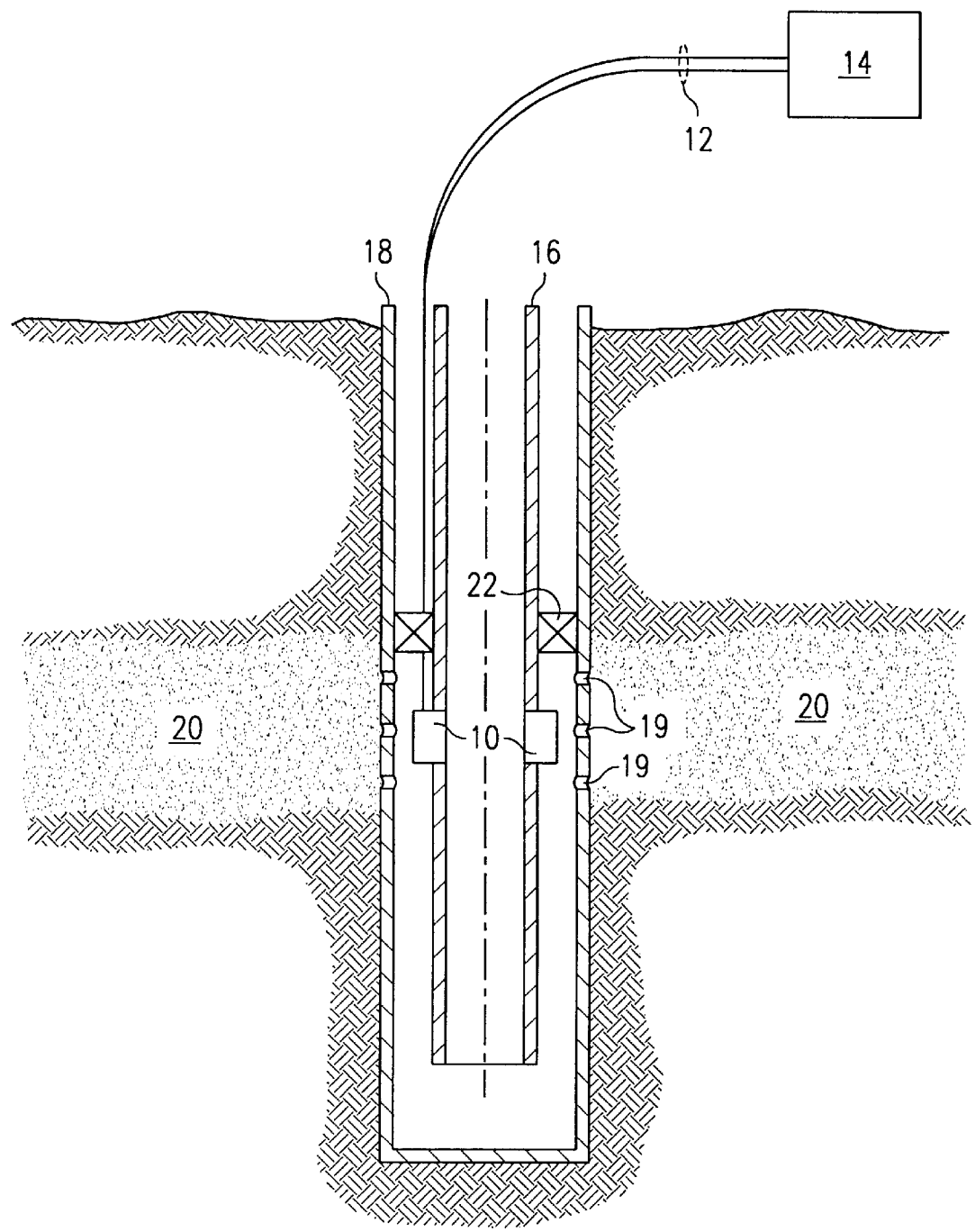
FIG. 1 is a schematic system overview.

In FIG. 1, a downhole optical tomograph chamber 10 within a wellbore is depicted. A bundle of optical fibers 12 connects the downhole optical tomograph chamber 10 to the surface system 14. The optical tomograph 10 is shown on the well tubing 16 and within the casing 18. Casing perforations 19 are shown and fluid can flow from the producing zone 20 into the annulus between the tubing 16 and casing 18 and then returned up the center of tubing 16 to the surface. Seal assembly 22 prevents fluid flow to the surface between tubing 16 and casing 18. The optical tomographic chamber 10 provides information on the fluids flowing up the tubing 16 with the information being conveyed up the optical fibers 12 and analyzed in the surface system 14.

The surface system 14 contains at least one optical transmitter or light source, such as a low power laser, and multiple optical receivers or detectors. At any one time, there is one fiber bundle used to transmit light and one less than the total number of fiber bundles used to detect light in the tomograph chamber 10. For example, the surface system 14 may contain one light source and two light detectors. The surface system 14 also includes a computer which analyzes the light received by each fiber bundle.

Differences in the optical properties of the production fluids cause differences in the amount of light transmitted to the receiving fiber bundles, as the light is, when there is anything other than a single phase transparent fluid, either absorbed, reflected or refracted. The optical properties of the multiple fluid phases and the relative sizes and shapes of the phases contained in the multiple fluids determine the pattern of light, and these patterns are detected by the detectors in the surface system 14 during a scan. The computer analyzes the fluid and determines the composition of the phases of the fluids.

Various types of optical fiber terminations can be used in the tomograph chamber 10. If no lense is used, in a clear one phase fluid, the light will be received substantially in the optical fiber bundle directly across from the transmitting fiber bundle. Other fiber bundles will receive substantial light only when there is reflection or refraction. Divergent lenses can be used to provide greater amounts of information. Two types of divergent lenses which may be used are cylindrical and conical. A cylindrical lens will provide a fanned shaped pattern of light, while s spherical lenses or conical lenses, spread light in a three dimensional conical pattern.

FIGS. 2A and 2B show an embodiment in which the optical fibers are terminated within the tomograph chamber 10 where no lenses are used in the fiber terminations. Thus, when light is introduced through fiber bundle 24 into tomograph chamber 10 having a clear fluid such as water flowing therethrough, the light will be passed directly across, as shown by the dotted line. Fiber bundles 26, 28, 30 receive little or no light as the light generally goes into optical fiber bundle 32, where it is collected and returned to the surface. Similarly optical fiber bundles 34, 36 and 38 collect little or no light.

FIG. 2B shows the effect of a single step of commutation where the light is now introduced into tomograph chamber 10 by fiber bundles 26, rather than fiber bundle 24. In this case, the light is generally collected by fiber bundle 34, and not by fiber bundles 32 as in FIG. 2A. This sort of commutation of course can be continued all around with the light being introduced in turn by fiber bundle 28, then 30, then 32, then 34, then 36, then 38, and the process continued by again introducing light into fiber bundle 24. In this manner the light is commutated around the tomograph chamber 10 and more information is available in the s signals received in the surface system 14 for analysis of the phases of the flowing fluid.

FIG. 3 depicts tomograph chamber 10 passing light through divergent lenses 40 and a clear single phase fluid. The lenses 40 on the fiber terminations not only spread the light emitted into the fluid, but also, provide better angular sensitivity to the receiving fibers. It should be noted that a tomograph chamber 10 can utilize multiple layers of optical fiber bundles and thus the layer shown in FIG. 3 could have one or more layers of optical fiber bundles either above and/or below the eight optical fiber bundles shown. For illustration purposes, one can use a layer of eight fiber bundles as shown, but have another layer of eight fiber bundles above and below the fiber bundles shown. In practice, many optical fibers may be used.

A single layer is preferred when cylindrical lenses are used at the fiber terminations to provide a fan like pattern of light from the transmitting fiber bundle. This fan like pattern of light is basically two dimensional but provides higher intensity light to the receiving fiber bundles. Conversely, multiple layers of fiber bundles provide greater amounts of information, and are preferably used with conical lenses to provide for three dimensional transmission and three dimensional receiving of light.

FIG. 4 shows light patterns similar to FIG. 3, with the transmitting fiber bundle being commutated to fiber bundle 26. As explained above, this sort of commutation of course can be continued all around with the light being introduced in turn by fiber bundles 28, then 30, then 32, then 34, then 36, then 38, and the process continued by again introducing light into fiber bundle 24. In this manner the light is commutated around the tomograph chamber 10 and more information is available in the signals received in the surface system 14 for analysis of the phases of the flowing fluid.

FIG. 5 depicts a tomographic chamber 10 in use with a multi phase fluid flowing through tomograph chamber 10. Typical multi phase fluid flow may be composed of a continuous phase fluid and one or more discontinuous phase fluids. In hydrocarbon production, the continuous phase may be oil or water while the discontinuous phase fluids may be oil, water or gas. In the illustrated example, the continuous phase fluid is water 42 and the discontinuous phase fluids are oil bubbles 44 and gas bubbles 46. During operation of tomographic chamber 10, light is introduced from fiber bundle 26 through a cylindrical lense 40 which provides a fan shaped pattern of light. The light passes directly to fiber bundles 28, 36, 38, and 24, and both directly and by reflection to fiber bundle 30. It can be seen that the oil bubble 44 absorbs light which would otherwise be transmitted directly across. In addition, light that would normally reach fiber bundle 34 is refracted to receiver 32 by gas bubble 46. It can also be seen that the commutation of light rapidly around the tomographic chamber 10 provides a quantity of information which allows the analysis of gas, oil and water flow up the tubing 16. Even though FIG. 5 has depicted a multi phase flow regime having a continuous phase fluid with two discontinuous phase fluid, it should be understood by those skilled in the art that the tomograph chamber 10 of the present invention is equally well-suited for analyzing multi phase fluid in other flow regimes including a stratified flow regime having multiple continuous phase fluids or a mist flow regime.

Figure 6:
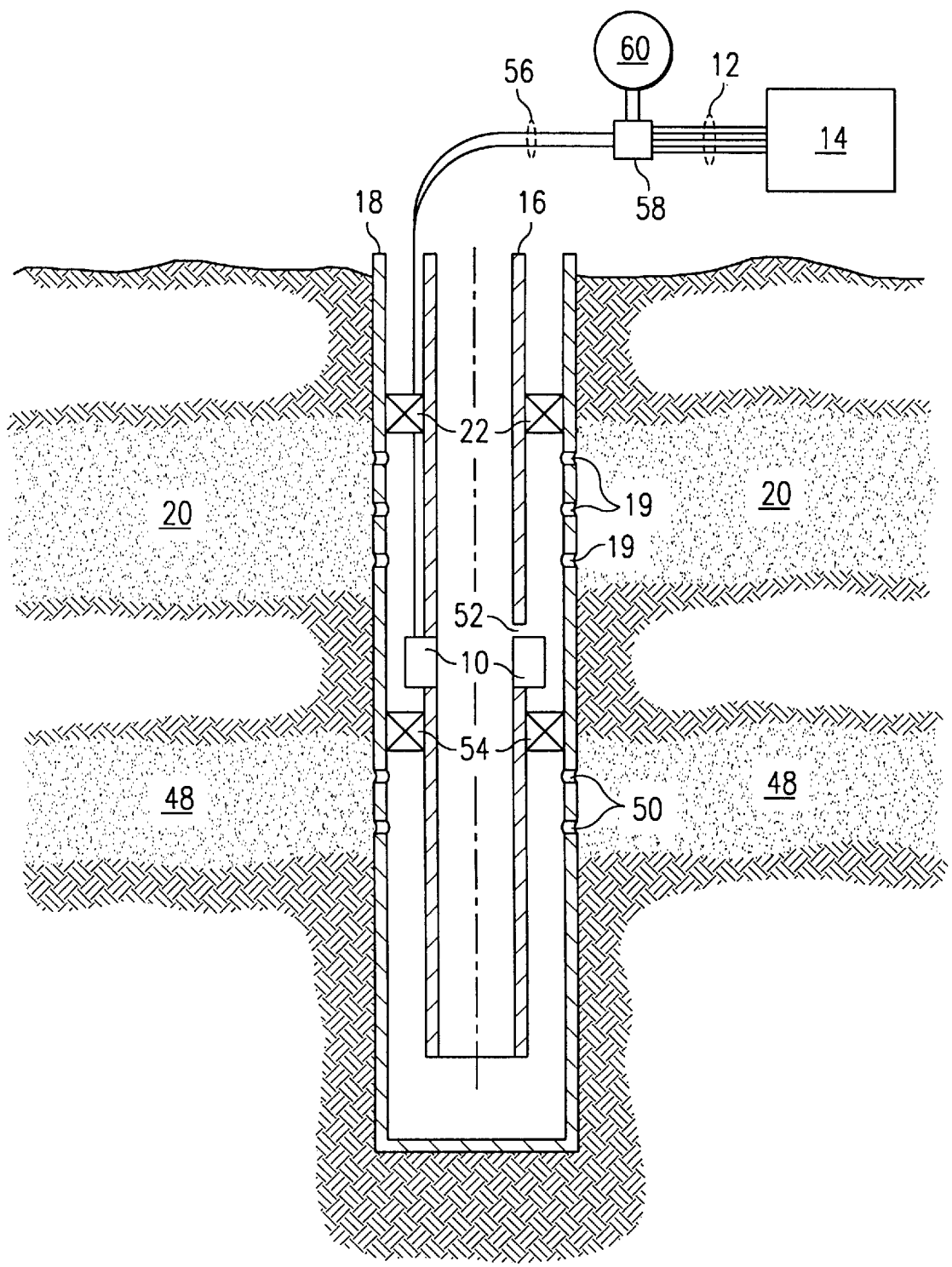
FIG. 6 is a schematic representation of a system elevation in which an upper and a lower hydrocarbon producing a zone is encountered, with provisions for tomographic monitoring of the production of the lower zone.

FIG. 6 illustrates a use of the optical tomograph 10 to analyze the production from two producing zones 20, 48. Zone 48 introduces fluid through casing perforations 50 into the wellbore, here with the liquid going into the annulus between the tubing 16 and the casing 18, to the bottom and then from the bottom of the hole up through the tubing 16 to the surface. In this embodiment, fluids from the zone 20 flows through the casing perforations 19, into the annulus between the tubing 16 and the casing 18 and into the tubing through a tubing opening 52 which is located above the tomograph chamber 10. The fluid from zone 20 cannot flow to the bottom of the hole because of the seal assembly 54 and is prevented from flowing to the surface between tubing 16 and casing 18 by seal assembly 22.

In this manner, the optical tomograph 10 sees flow only from zone 48, but does not see the production from the zone 20. The fluid from the zone 20 flows through perforations 19 and tubing opening 52 and then goes directly up to the tubing 16 to the surface, bypassing the tomograph chamber 10. Thus, an analysis at the surface can determine the total quantities of gas, oil, and water and the tomograph chamber 10 can determine the production from zone 48. The production from zone 48 may then be subtracted to provide production information on zone 20. Thus, the production from each of two zones 20, 48 can be determined.

FIG. 6 also illustrates the use of a protective tube 56 around the optical fiber bundle 12, where the protective tube 56 contains the optical fiber bundle 12 which are fed through a pressure bulkhead 58 and where a pump 60 is used to provide hydraulic pressure to prevent inward leakage into the protective tube 56.

Figure 7:
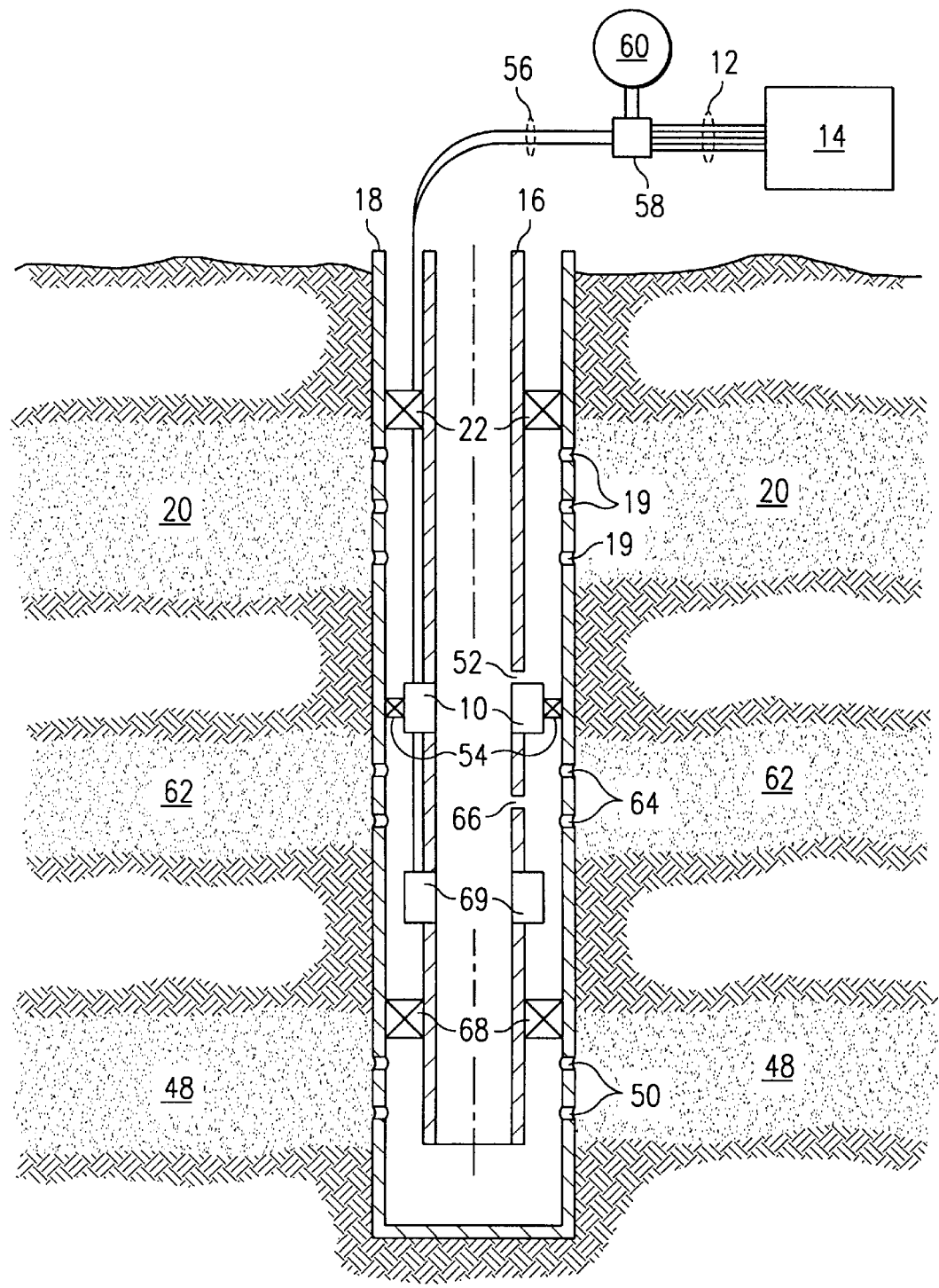
FIG. 7 is a schematic representation of a system elevation of a well with three producing zones and two optical tomographs.

FIG. 7 illustrates the use of multiple optical tomograph chambers 10, 69. In addition to zone 20 and zone 48, there is an intermediate producing zone 62. Zone 20 again produces into the annulus through perforation 19, and fluid is again introduced into the tubing 16 from zone 20 through tubing opening 52 from where the fluid flows up the tubing 16. Similarly, fluid from the zone 48, again goes into the annulus, goes to the bottom of the hole and then up the center of the tubing 16. In this example, the fluid from zone 62 enters the annulus through casing perforation 64 and then into the tubing 16 through tubing opening 66. Fluid from zone 62 then flows up the tubing 16, but bypassing optical tomograph chamber 69 as seal assembly 68 prevents liquids from zone 62 from flowing to the bottom of the hole. Fluid from zone 62 is mixed within the tubing 16 with fluid from the zone 48 and the mixed fluid from these two zone 62, 64 is then analyzed by tomograph chamber 10. Thus, it can be seen that the results from the analysis by tomograph chamber 10 can be subtracted from the total production measure on the surface to provide the production of zone 20, and the information from optical tomographic chamber 69 can be utilized to directly indicate the production of zone 48. Subtracting the production of zone 48 from the results obtained from tomograph chamber 10 gives the production from zone 62.

Figure 8:
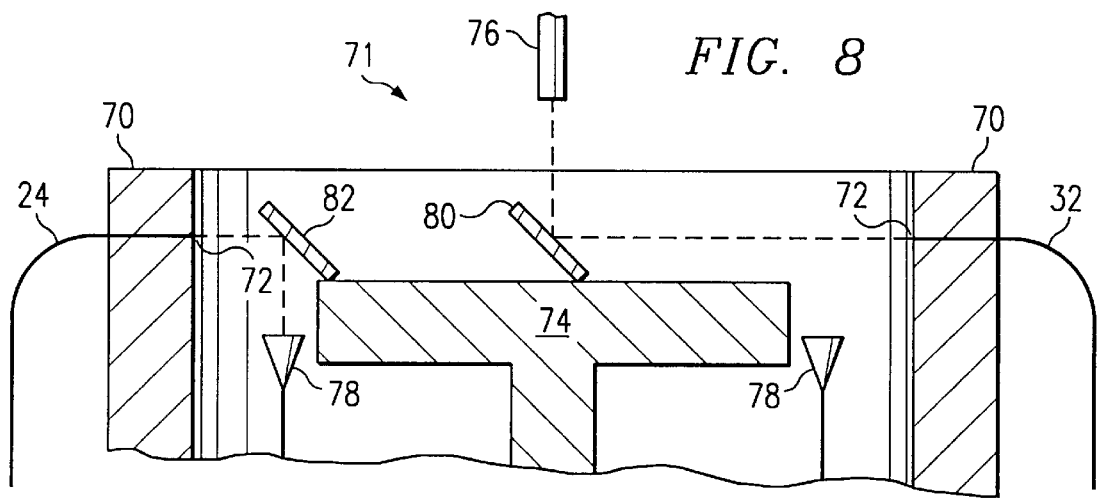
FIG. 8 is a cross sectional view of a commutator which provides for sequential introduction of light into one fiber and the receiving and detection of light from other fibers.

FIG. 8 shows one embodiment of a commutator 71 for commutating the light introduction around the tomograph chamber 10. Light source 76 generates light which is to be fed through optical fiber bundle 32 down into the hole and into the tomograph chamber 10. A portion of the light is picked up by one of the other fiber bundles, here fiber bundle 24, brought back up the hole and detected by light detector 78.

The commutator 71 is preferably part of the surface system 14 and includes the cylindrical outer support 70 which holds the upper end of the optical fibers (illustrated here with optical fiber bundles 24 and 32), and showing the upper optical fiber termination 72. A rotating mirror table 74 is used to provide motion for the commutation. Here the rotating table 74 holds transmitting mirror 80 and receiving mirror 82. Light comes from light source 76 and is reflected off transmitting mirror 80 into optical fiber 32, where light is introduced in the tomograph chamber 10 and collected as previously described. Light returning through optical fiber bundle 24 is reflected by receiving mirror 82 and is detected by detector 78.

Generally, an electrical signal is produced by the light detector 78 which electrical signal is sent to the computer where information is gathered on the optical properties of the downhole fluid flowing in the well and images or quantitative values of phases flowing in the well can be generated. In this example, four fiber bundles and four detectors are used, as best seen in FIG. 9, and in such a configuration, there would be one transmitting mirror 80 and three receiving mirrors 82.

Figure 9:
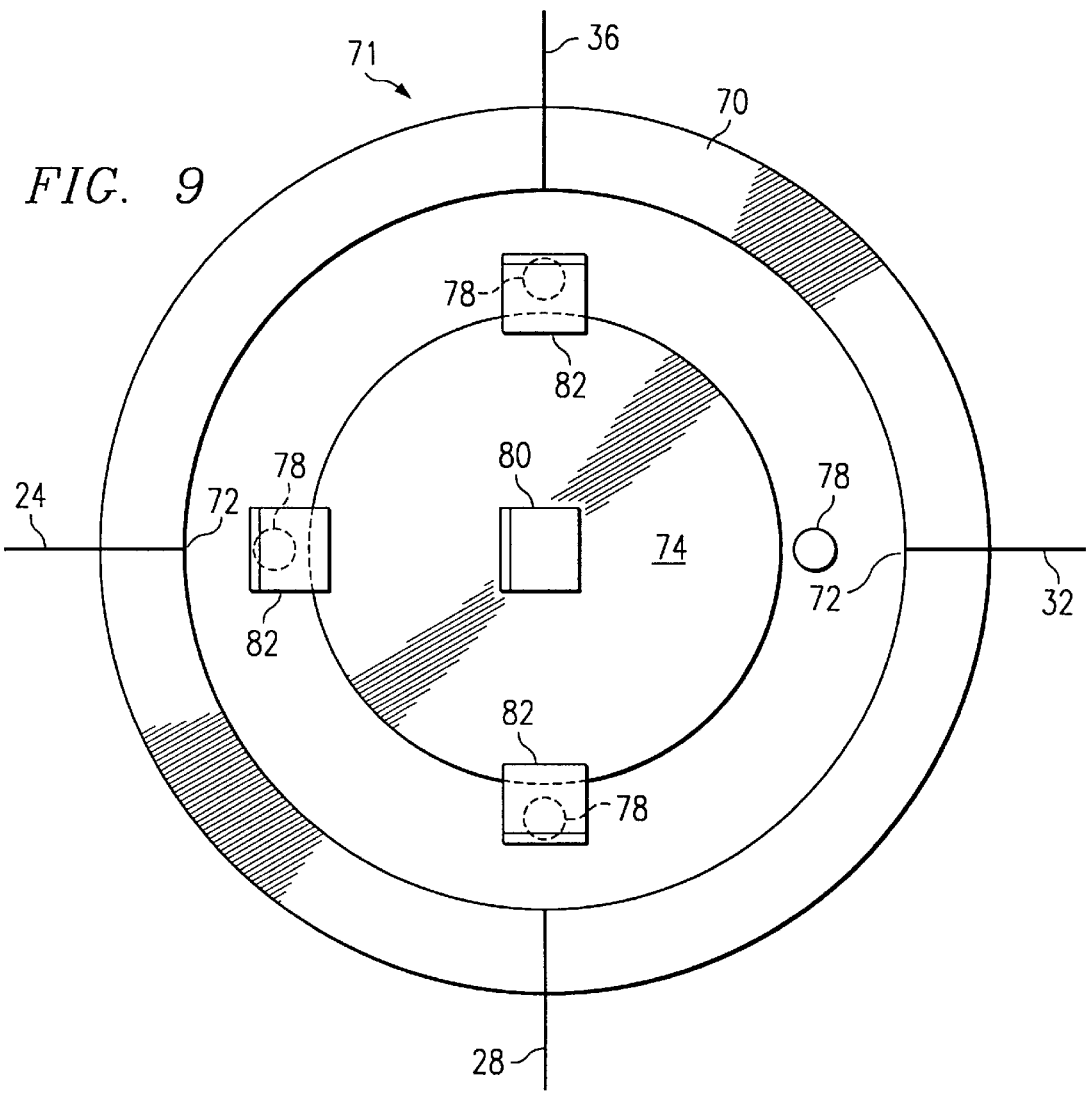
FIG. 9 is a top view of a commutator which can provide commutation of the light around a downhole tomograph chamber.

FIG. 9 shows a top view of the rotating mirror table 74 of FIG. 8, showing light detectors 78, three of which are beneath receiving mirrors 82, and are shown as dotted circles. Light reflects off transmitting mirror 80, and goes past detector 78 into optical fiber bundle 32. Light returning from the tomograph chamber 10 through optical fiber bundles 24, 28, and 36 is reflected by the three receiving mirrors 82 to the light detectors 78 shown as dotted circles beneath the mirrors 82.

Generally the light source 76 can be a laser. A pulsed laser could be used, timed to the rotation of the rotating mirror table 74. Alternate light sources, e.g. an incandescent lamp or super radiant LED could also be used. In addition, even though the optical tomograph chamber embodiments shown herein are used as a part of the tubing or a pipe string in a cased wellbore, it should be apparent to those of ordinary skill in the art that the system could also be used at the surface.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An optical tomograph chamber for providing information on downhole fluid flowing through a wellbore comprising:
   a housing for placement within the wellbore such that the downhole fluid may flow therethrough;
   an optical transmission device at least partially disposed within the housing transmitting light into the downhole fluid flowing through the housing; and
   an optical reception device at least partially disposed within the housing receiving at least a portion of the light transmitted into the downhole fluid flowing through the housing.

2. The optical tomograph chamber as recited in claim 1 wherein the optical transmission device further comprises an optical fiber bundle.

3. The optical tomograph chamber as recited in claim 1 wherein the optical transmission device further comprises a lens.

4. The optical tomograph chamber as recited in claim 3 wherein the lens is a cylindrical lens.

5. The optical tomograph chamber as recited in claim 3 wherein the lens is a conical lens.

6. The optical tomograph chamber as recited in claim 1 wherein the optical reception device further comprises an optical fiber bundle.

7. The optical tomograph chamber as recited in claim 1 wherein the optical reception device further comprises a lens.

8. The optical tomograph chamber as recited in claim 7 wherein the lens is a cylindrical lens.

9. The optical tomograph chamber as recited in claim 7 wherein the lens is a conical lens.

10. The optical tomograph chamber as recited in claim 1 wherein the optical reception device further comprises a plurality of optical fiber bundles spaced apart around the housing.

11. The optical tomograph chamber as recited in claim 1 wherein the optical reception device further comprises a plurality of lenses spaced apart around the housing.

12. An optical tomograph chamber for providing information on downhole fluid flowing through a wellbore comprising:
   a housing for placement within the wellbore such that the downhole fluid may flow therethrough;
   first and second lenses disposed on the interior of the housing;
   a first optical fiber bundle at least partially disposed within the housing transmitting light through the first lens into the downhole fluid flowing through the housing; and
   a second optical fiber bundle at least partially disposed within the housing receiving, through the second lens, at least a portion of the light transmitted into the downhole fluid flowing through the housing.

13. The optical tomograph chamber as recited in claim 12 further comprising a third lens and a third optical fiber bundle at least partially disposed within the housing receiving, through the third lens, at least a portion of the light transmitted into the downhole fluid flowing through the housing.

14. The optical tomograph chamber as recited in claim 13 further comprising a fourth lens and a fourth optical fiber bundle at least partially disposed within the housing receiving, through the fourth lens, at least a portion of the light transmitted into the downhole fluid flowing through the housing.

15. The optical tomograph chamber as recited in claim 12 wherein the lenses are cylindrical.

16. The optical tomograph chamber as recited in claim 12 wherein the lenses are conical.

17. A method for providing information on downhole fluid flowing through a wellbore, the method comprising:
   introducing light into the downhole fluid flowing through an optical tomograph chamber;
   collecting at least a portion of the light that has passed through the downhole fluid; and
   analyzing the at least a portion of the light to obtain information on the downhole fluid flowing through the tomograph chamber.

18. The method as recited in claim 17 wherein the step of introducing light into the downhole fluid flowing through an optical tomograph chamber further comprises passing the light through an optical fiber bundle.

19. The method as recited in claim 17 wherein the step of collecting at least a portion of the light that has passed through the downhole fluid further comprises passing the at least a portion of the light through an optical fiber bundle.

20. The method as recited in claim 17 wherein the step of introducing light into the downhole fluid flowing through an optical tomograph chamber further comprises passing the light through a lens.

21. The method as recited in claim 17 wherein the step of collecting at least a portion of the light that has passed through the downhole fluid further comprises passing the at least a portion of the light through a lens.

22. The method as recited in claim 17 wherein the step of collecting at least a portion of the light that has passed through the downhole fluid further comprises passing the light through a plurality of optical fiber bundles.

23. The method as recited in claim 17 wherein the step of analyzing the at least a portion of the light to obtain information on the downhole fluid flowing through the optical tomograph chamber further comprises obtaining quantitative values of phases of the downhole fluid flowing through the optical tomograph chamber.

24. The method as recited in claim 23 wherein the phases are selected from the group consisting of water, gas and oil.

25. The method as recited in claim 17 further comprising the step of generating images of the downhole fluid flowing through the optical tomograph chamber.

26. A method for providing information on downhole fluid flowing through a wellbore, the method comprising:
   introducing light from a first optical fiber bundle into an optical tomograph chamber disposed within the wellbore;
   collecting a first portion of the light in a second optical fiber bundle and a second portion of the light in a third optical fiber bundle;

conveying the first portion of light through the second optical fiber bundle and the second portion of light through the third optical fiber to a surface system; and analyzing the first and second portions of light in the surface system to generate a first set of information on optical properties of the downhole fluid flowing through the wellbore.

27. The method as recited in claim 26 wherein the step of conveying the first portion of light through the second optical fiber bundle and the second portion of light through the third optical fiber to the surface system is followed by the steps of:

introducing light from the second optical fiber bundle into the optical tomograph chamber;

collecting a third portion of the light in the first optical fiber bundle and a fourth portion of the light in the third optical fiber bundle;

conveying the third portion of light through the first optical fiber bundle and the fourth portion of light through the third optical fiber bundle to the surface system; and analyzing the third and fourth portions of light in the surface system to generate a second set of information on optical properties of the downhole fluid flowing through the wellbore.

28. The method as recited in claim 27 wherein the step of conveying the third portion of light through the first optical fiber bundle and the fourth portion of light through the third optical fiber to the surface system is followed by the steps of:

introducing light from the third optical fiber bundle into the optical tomograph chamber;

collecting a fifth portion of the light in the first optical fiber bundle and a sixth portion of the light in the second optical fiber bundle;

conveying the fifth portion of light through the first optical fiber bundle and the sixth portion of light through the second optical fiber bundle to the surface system; and analyzing the fifth and sixth portions of light in the surface system to generate a third set of information on optical properties of the downhole fluid flowing through the wellbore.

29. The method as recited in claim 28 wherein the step of conveying the fifth portion of light through the first optical fiber bundle and the sixth portion of light through the second optical fiber to the surface system is followed by the steps of:

introducing light from the first optical fiber bundle into the optical tomograph chamber;

collecting a seventh portion of the light in the second optical fiber bundle and a eighth portion of the light in the third optical fiber bundle;

conveying the seventh portion of light through the second optical fiber bundle and the eighth portion of light through the third optical fiber bundle to the surface system; and analyzing the seventh and eighth portions of light in the surface system to generate a fourth set of information on optical properties of the downhole fluid flowing through the wellbore.

30. The method as recited in claim 29 further comprising the step of generating quantitative values of the phases of the downhole fluid from the first, second, third and fourth sets of information on optical properties of the downhole fluid flowing through the wellbore.

31. The method as recited in claim 29 further comprising the step of generating an image of the phases of the downhole fluid from the first, second, third and fourth sets of information on optical properties of the downhole fluid flowing through the wellbore.

32. The method as recited in claim 30 wherein the phases are selected from the group consisting of water, gas and oil.

33. An apparatus for providing information on downhole fluid flowing through a wellbore comprising:

at least three optical fiber bundles having lower terminations in an optical tomograph chamber disposed in the wellbore and having upper terminations in a surface system;

a light source in the surface system;

at least two light detectors in the surface system; and a commutator in the surface system to link the light source sequentially to one of the optical fiber bundles and to link the light detectors to the other optical fiber bundles.

34. The apparatus as recited in claim 33 wherein the light detectors produce electrical signals which contain information on optical properties of the downhole fluid flowing through the wellbore.

35. The apparatus as recited in claim 34 wherein the signals are analyzed to provide quantitative values of phases of the downhole fluid flowing through the wellbore.

36. The apparatus as recited in claim 34 wherein the signals are analyzed to provide images of phases of the downhole fluid flowing through the wellbore.

37. The apparatus as recited in claim 35 wherein the phases are selected form the group consisting of water, gas and oil.

* * * * *